United States Patent [19]
Knisely

[11] Patent Number: 5,968,578
[45] Date of Patent: Oct. 19, 1999

[54] BAKING SYSTEM AND METHOD USING OSCILLATING BAFFLES FOR HEAT TRANSFER ENHANCEMENT

[76] Inventor: Charles W. Knisely, R.R. 6, Box 266A, Lewisburg, Pa. 17837

[21] Appl. No.: 08/986,700

[22] Filed: Dec. 8, 1997

[51] Int. Cl.$^6$ .............................. A23L 1/00; F25D 17/00
[52] U.S. Cl. .............................. 426/524; 34/231; 34/487; 62/63; 62/374; 99/470; 99/473; 99/481; 165/120
[58] Field of Search .................. 426/524; 62/63, 62/374, 331; 99/470, 473, 481; 165/120; 34/487, 488, 229, 231

[56] References Cited

U.S. PATENT DOCUMENTS

| | | | |
|---|---|---|---|
| 3,556,817 | 1/1971 | Jeppson | 99/470 |
| 3,879,954 | 4/1975 | Cann | 62/63 |
| 4,327,869 | 5/1982 | Motoyuki | 60/230 |
| 4,350,027 | 9/1982 | Tyree, Jr. | 62/374 |
| 4,377,109 | 3/1983 | Brown | 99/401 |
| 4,532,857 | 8/1985 | Sollich | 99/481 |
| 4,562,701 | 1/1986 | Newsome | 62/187 |
| 5,334,406 | 8/1994 | Appolonia | 426/524 |
| 5,487,908 | 1/1996 | Appolonia | 426/524 |

*Primary Examiner*—George Yeung
*Attorney, Agent, or Firm*—John J. Elnitski, Jr.

[57] ABSTRACT

Disclosed is an apparatus and method to redirect airflow and enhance heat transfer using an oscillating baffle in a baking system. This apparatus and method allows for the improved efficiency of a cooling tunnel, while reducing the size of the tunnel. Several embodiments of the oscillating baffle have a first degree of freedom and a second degree of freedom which allows it to oscillate under the power of the airflow. The method employs the oscillating baffle to redirect and mix the airflow in order to enhance heat transfer in the cooling tunnel. The oscillating baffle is used for cooling, for heating, for enhancing the mixing of a multi-component air flow or redirecting an air flow in the baking system.

20 Claims, 13 Drawing Sheets

Fig. 19 ns of the page.

BAKING SYSTEM AND METHOD USING OSCILLATING BAFFLES FOR HEAT TRANSFER ENHANCEMENT

BACKGROUND

Every industry that deals with heat transfer strives to simplify and reduce the size of the apparatus employed to perform the heat transfer function, while improving heat transfer efficiency. For instance, the commercial baking industry desires to improve the convective heat transfer while cooling a baked product on a moving belt. Often the belt with the baked product is placed inside an enclosed channel, generally referred to as a cooling tunnel. The cooling tunnel usually has a rectangular cross-section and is very long in nature. The product to be cooled usually travels along the bottom of the tunnel. Air or other gases for cooling are forced along the top of the cooling tunnel by a fan to effect the heat transfer. Due to the long nature of the cooling tunnel, it is always desired to find ways to reduce the cooling tunnel length. Other industries use such channels to convey heat as well as remove it. Typically such heat transfer channels of this nature are referred to as cooling tunnels, heating tunnels, cooling channels, ovens and so on. In this discussion and the claims included hereinafter, these types of channels will be collectively referred to as heat transfer tunnels. The gaseous medium used to effect the heat transfer can be any gas desired for the purpose of heat transfer. In most cases the gas used for heat transfer will be air and therefore all gases that can be use will be collectively referred to as air in this discussion and the claims included hereinafter.

Convective heat transfer is governed by Newton's Law of Convection, which can be written as $q=Q/A=h(T_S-T_\infty)$. Where q is the heat flux (rate of heat transfer per unit area); Q is the rate of heat transfer; A is the surface area to or from which heat is being transferred; h is the convective heat transfer coefficient; $T_S$ is the surface area temperature; and $T_\infty$ is the ambient air temperature far from the surface area, usually towards the top of the heat transfer tunnel. From the above equation, the only way to increase the heat flux from the surface area to be affected by the heat transfer is to either increase h or increase the temperature difference $(T_S-T_\infty)$.

Figure 1:
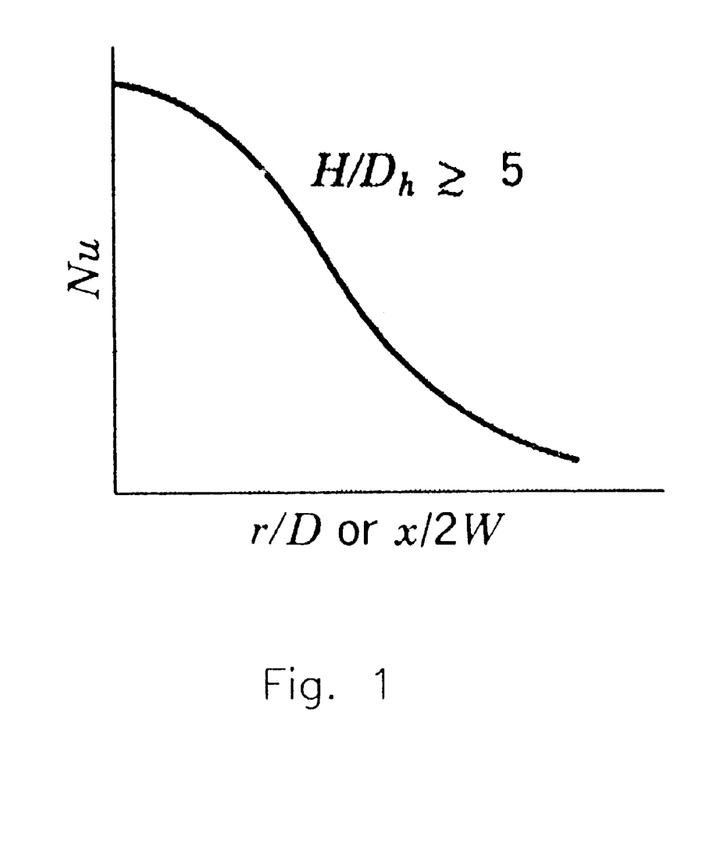
FIG. 1 is a graph of distribution of convective heat transfer coefficient of the prior art.
Figure 2:
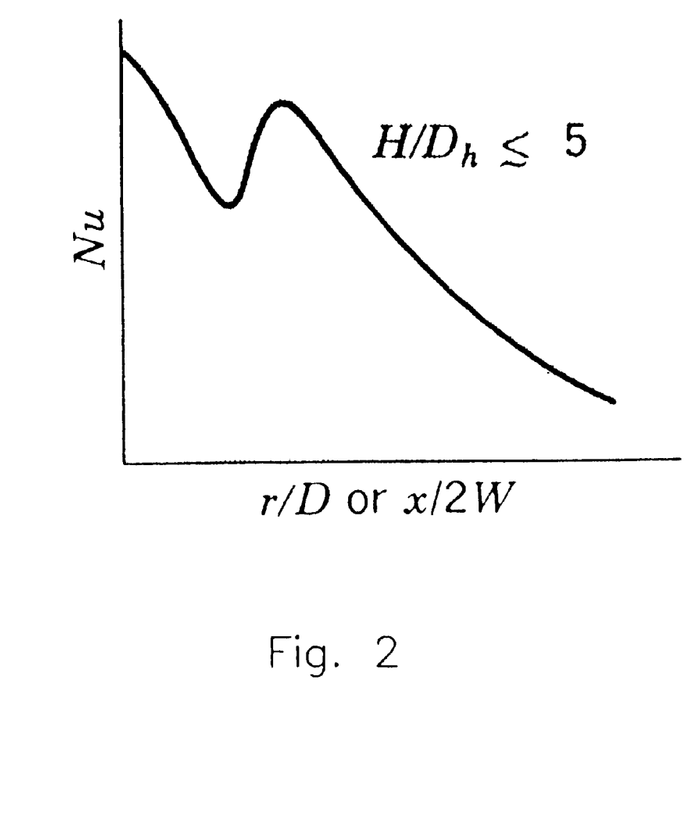
FIG. 2 is a graph of distribution of convective heat transfer coefficient of the prior art.

A current method of enhancing heat transfer in a heat transfer tunnel is the method of impingement heat transfer. Impingement heat transfer is the directing of air through many air jets which are aimed directly onto the surface area of the product to be heated or cooled. The convective heat transfer coefficient depends strongly on the lateral distance from the impinging air jet as shown by the graphs in FIGS. 1 and 2. FIG. 1 shows the distribution of the convective heat transfer coefficient as a function of distance from jet centerline for a large nozzle-to-surface area spacing. FIG. 2 is the same as FIG. 1, but for a small nozzle-to-surface area spacing. Accordingly, a large number of relatively closely spaced jets are required to heat or cool a commercial product. This method is expensive due to the large number of impinging jets that are needed to provide heating or cooling in commercially sized heat transfer tunnels. It is difficult to provide an effective distribution of the air flow to the nozzles for these jets. Also, there is the requirement to remove the "waste" air after it impinges vertically on the surface area of the product without disrupting the desired impinging jet flow pattern.

It is an object of the present invention to provide an apparatus and method to redirect airflow and enhance heat transfer using an oscillating baffle in a baking system. It is also an object of the present invention to provide an apparatus and method to improve the efficiency of a cooling tunnel of a baking system, while reducing the size of the tunnel.

SUMMARY OF THE INVENTION

The present invention is a baking system utilizing an oscillating baffle and method to redirect airflow and enhance heat transfer in a cooling tunnel. The oscillating baffle is a baffle having a length between two ends, and a height and width which form a cross-section of the baffle. The baffle has a first degree of freedom and a second degree of freedom which allows it to oscillate under the power of the airflow. There are several embodiments providing the first and second degrees of freedom that are disclosed. The method employs an oscillating baffle to redirect and mix the airflow in order to enhance heat transfer in the cooling tunnel.

DETAILED DESCRIPTION

Figure 3:
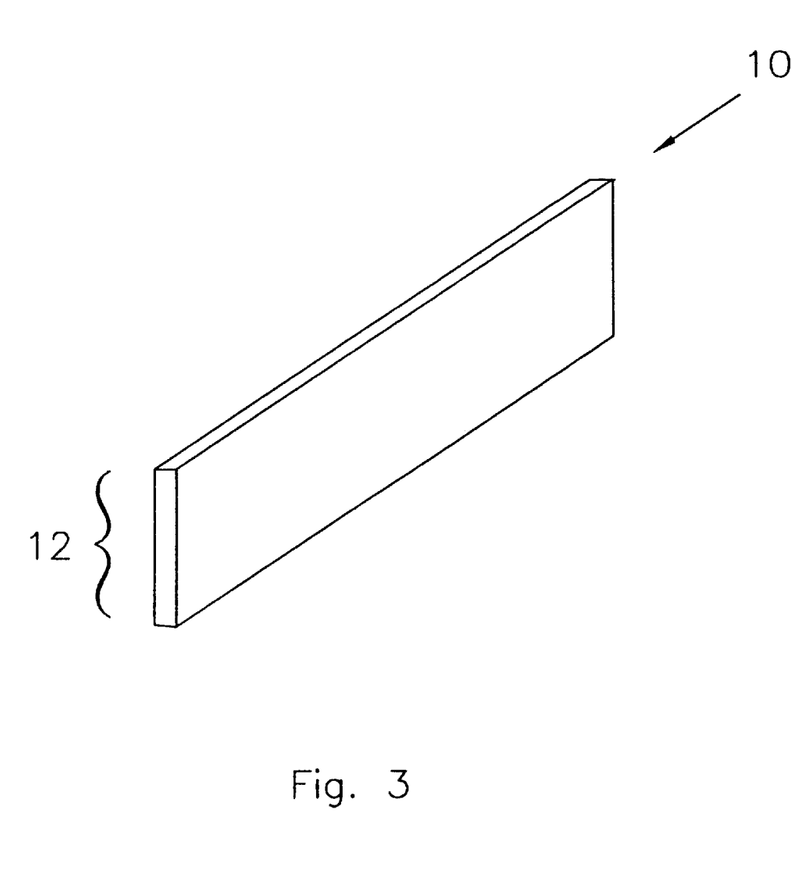
FIG. 3 is a perspective view of a baffle according to the present invention.
Figure 4:
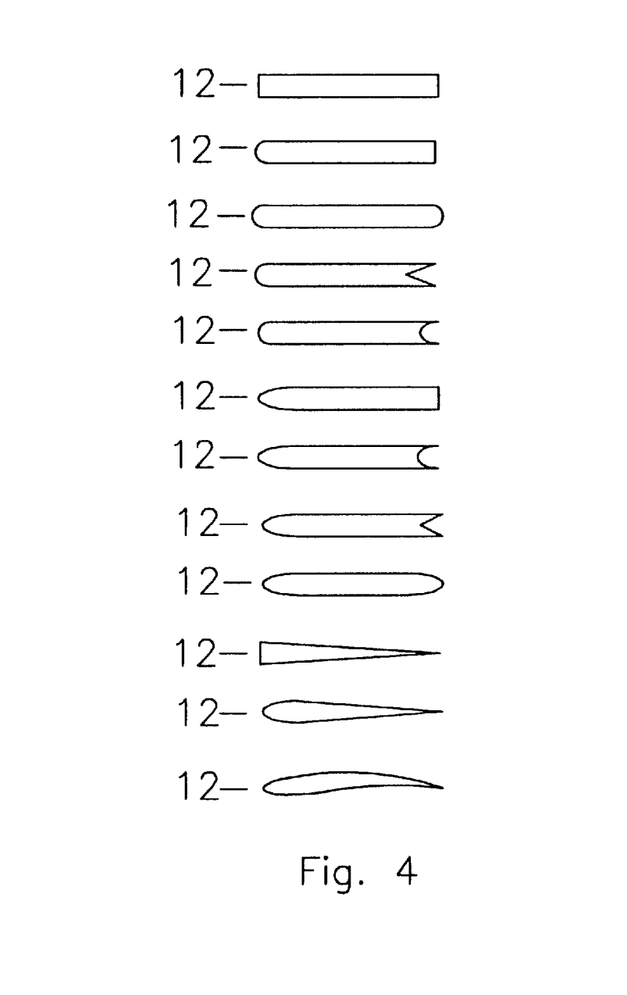
FIG. 4 is series of examples of possible baffle cross-sectional shapes.

The present invention provides an oscillating baffle to enhance heat transfer in a cooling tunnel of a baking system. All embodiments of the present invention employ a baffle 10 as shown in FIG. 3. The baffle 10 has a height 7, length 8 and width 9. The height 7 and width 9 of the baffle 10 define the baffle's cross-sectional shape 12. The height 7 and length 8 of the baffle 10 define the largest surface area of the baffle 10. The cross-sectional shape 12 of the baffle 10 can range from a rectangle to an airfoil. Examples of possible the cross-sectional shape 12 that can be used are shown in FIG. 4. The dimensions 7,8,9 and cross-sectional shape 12 of the baffle 10 will largely depend on the application in which the baffle 10 is employed. The oscillating baffles 10 can be used for cooling, for heating, for enhancing the mixing of a multi-component air flow or redirecting an air flow. Other applications could include use in dusty environments to provide high speed gas streams sweeping a wall to prevent the build-up of dust.

Figure 5:
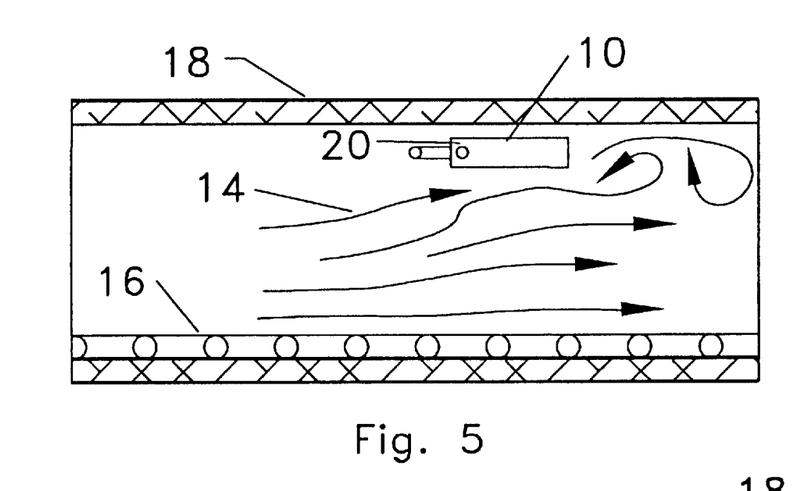
FIG. 5 is a cross-sectional view showing the operation of a baffle according to the present invention.
Figure 6:
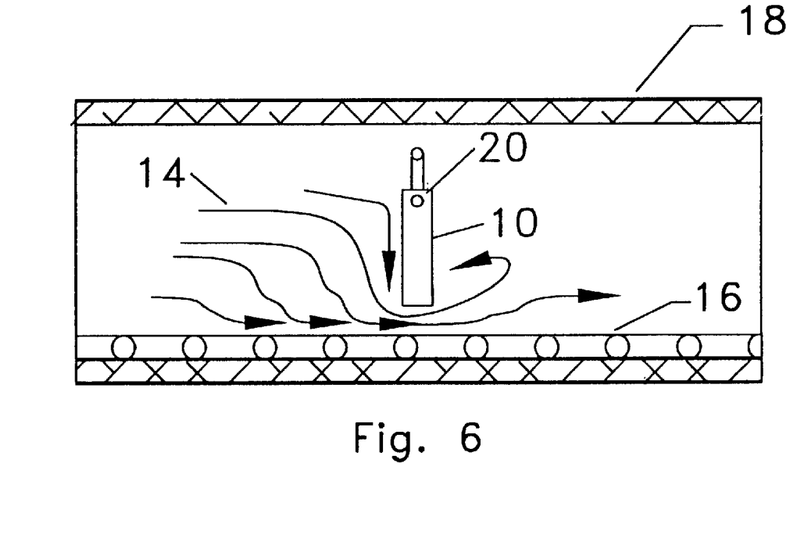
FIG. 6 is a cross-sectional view showing the operation of a baffle according to the present invention.

FIGS. 5 and 6 show the operation of the oscillating baffle 10 as a heating or cooling air flow 14 passes the baffle 10. FIG. 6 shows the baffle 10 in its lowest position in which the largest surface area of the baffle 10 is perpendicular to the air flow 14. FIG. 5 shows the baffle 10 in the raised position which is about ninety degrees (90°) from the lowest position. The product surface area 16 to be affect by the heat transfer is usually positioned below the baffle 10. FIG. 5 illustrates the air flow 14 moving along the heat transfer tunnel 18 as the baffle 10 is at the top of its oscillation in the raised position. FIG. 6 illustrates how the air flow 14 is affected when the baffle 10 oscillates back toward the product surface area 16 intended to be affected by the heat transfer. Downward motion of the baffle's largest surface redirects the air flow 14 onto the surface area 16 to be heated or cooled. The redirected air creates a local region having a high heat transfer coefficient. In addition, the mixing brought about by the motion of the oscillating baffle 10 creates a greater temperature gradient near the product surface area 16. The usual streamwise development of the local convective heat transfer coefficient in a heat transfer tunnel with no oscillating baffles 10 is a monotonically decreasing function of streamwise position. The oscillating baffle 10 periodically "sweeps" away the existing thermal and hydrodynamic boundary layers and initiates growth of a new boundary layer. At the start of any boundary layer, the heat transfer coefficient has its highest value. By periodically initiating new boundary layers, the oscillating baffle 10 assures a time-averaged high value for the local convective heat transfer coefficient in the area near the baffle 10. When spatially averaged, the maintaining of the higher local heat transfer coefficients along the length of the heat transfer tunnel with a series of baffles results in a higher characteristic heat transfer coefficient for the entire heat transfer tunnel. Further, as the baffle 10 moves from the lowest position shown in FIG. 6 to the highest position shown in FIG. 5, the baffle 10 drags some of the air that has already experienced heat transfer with the product surface area 16. The air that is dragged away mixes with the air that is away from the product surface area 16, thereby resulting in a newly mixed air stream that is subsequently forced back down toward the product surface area 16 by the next oscillating baffle 10. This suggests that another application of the oscillating baffles 10 is the mixing of air flow streams.

In most of the embodiments shown in FIGS. 7–14 of the oscillating baffle 10 according to the present invention the following is true as is shown in FIGS. 5 and 6. The embodiments are directed more to suspension of the baffle 10 in the air flow 14 rather than the baffle cross-section 12. The baffle 10 is suspended in the air flow 14 near its top 20 and has two degrees of freedom from that suspension. The two degrees of freedom of the baffle 10 uniquely allows the baffle 10 to rise to the raised position of FIG. 5 and fall back to the position in FIG. 6 due to the weight of the baffle 10. In contrast, if there was only one degree of freedom, the baffle 10 would only rise about forty-five degrees (45°) and remain stationary in the constant air flow. The baffle 10 will undergo self-sustained oscillations or vibrations with the proper weight distribution due to the flow of air past the baffle 10. The proper weight distribution for the baffle 10 was found by gluing a hollow tube (not shown) to the bottom of the baffle 10 and adding tubular weights (not shown). The weights were added until the baffle 10 would oscillate from the lower position to the higher position with no other external force but the air flow 14. All baffle embodiments were tested and found to enhance heat transfer in a heat transfer tunnel using a test procedure to be explained further in this discussion. A series of oscillating baffles 10 spaced periodically in a heat transfer tunnel provided about twice the heat transfer rate than was obtained at the same upstream air velocity without the baffles.

Figure 7:
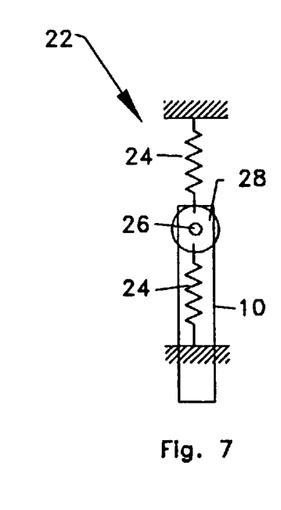
FIG. 7 is a side view of an embodiment of a baffle.
Figure 8:
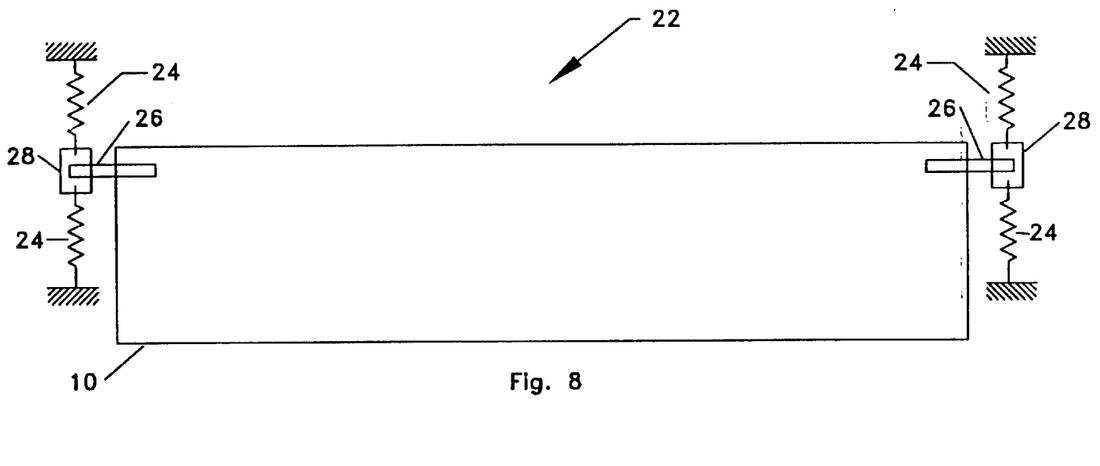
FIG. 8 is a front view of the baffle shown in FIG. 7.

A first embodiment 22 of the oscillating baffle is a baffle 10 mounted between vertically coiled springs 24 to provide a heaving degree of freedom in addition to a rotational degree of freedom. As shown in FIGS. 7 and 8, a rod end 26 extends from each side of the baffle 10 at about the quarter cord point of the baffle's cross-section 12. Each rod end 26 is rotatably secured in a bearing 28 providing a first degree of freedom. Each bearing 28 is further secured and suspended between two vertical springs 24 providing a second degree of freedom. The disadvantage of the embodiment 28 is that the bottom spring 24 may interfere with the movement of product to be affected by the heat transfer.

Figure 9:
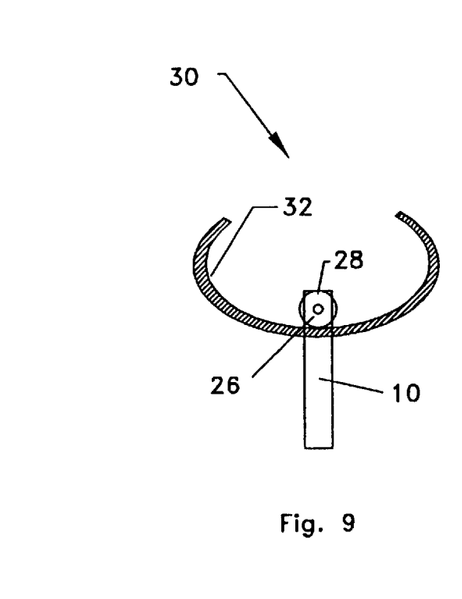
FIG. 9 is a side view of an embodiment of a baffle.
Figure 10:
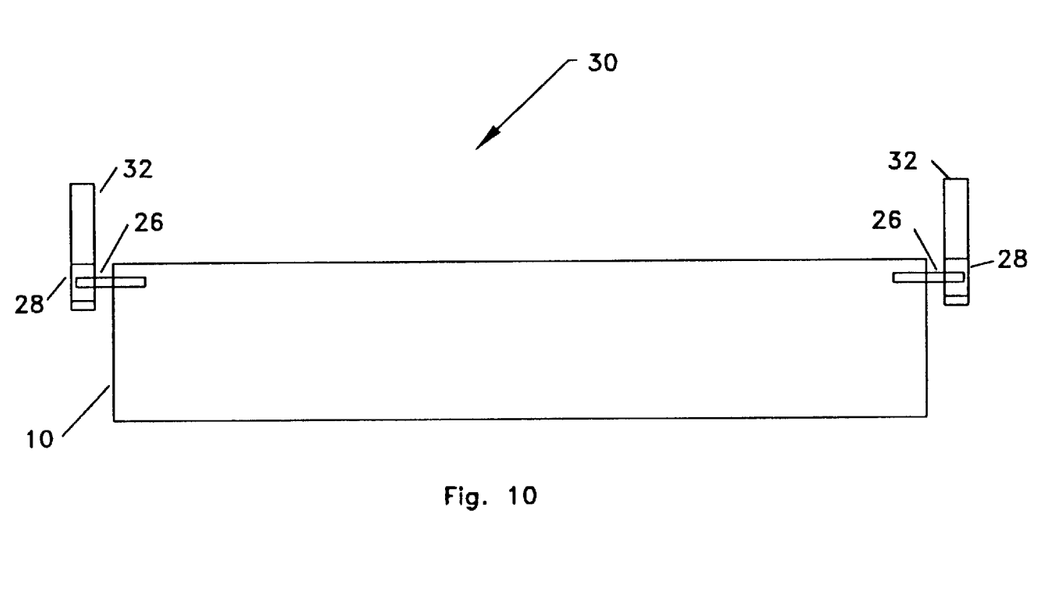
FIG. 10 is a front view of the baffle shown in FIG. 9.
Figure 11:
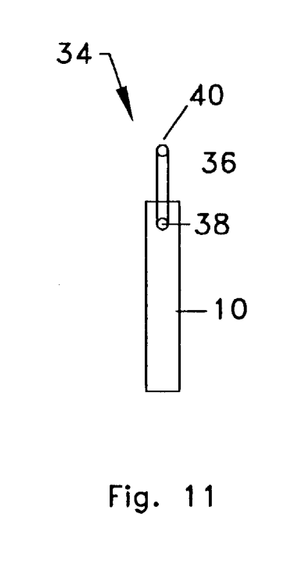
FIG. 11 is a side view of an embodiment of a baffle.
Figure 12:
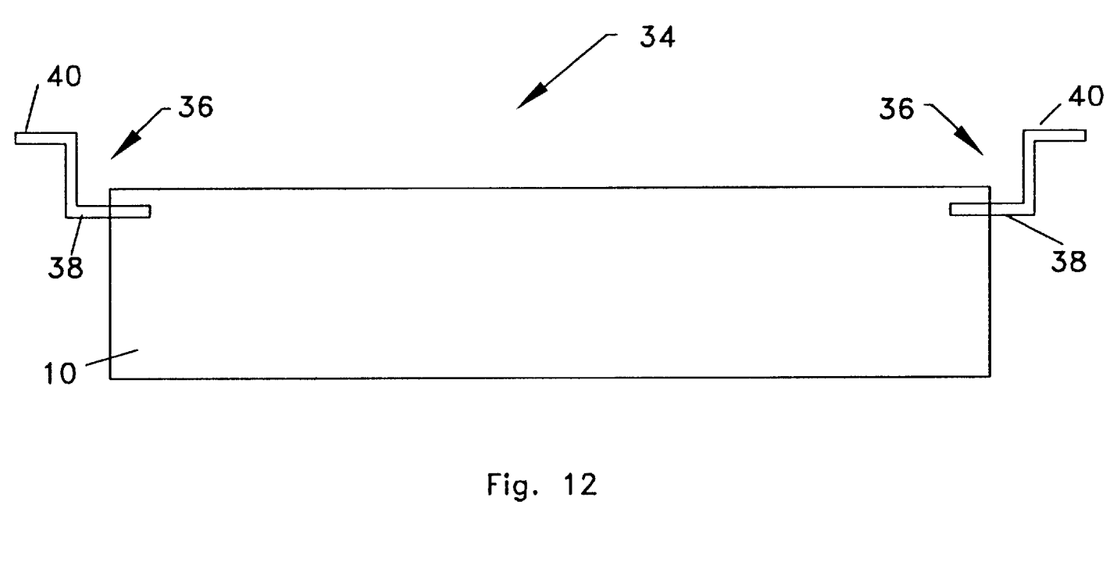
FIG. 12 is a front view of the baffle shown in FIG. 11.
Figure 13:
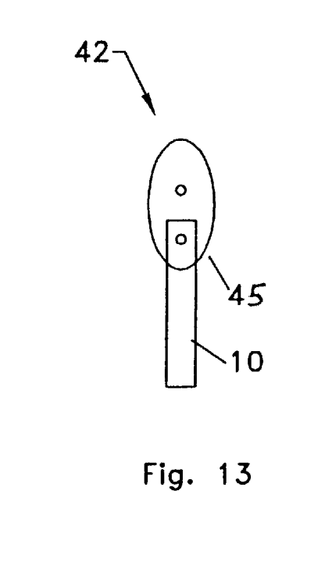
FIG. 13 is a side view of an embodiment of a baffle.
Figure 14:
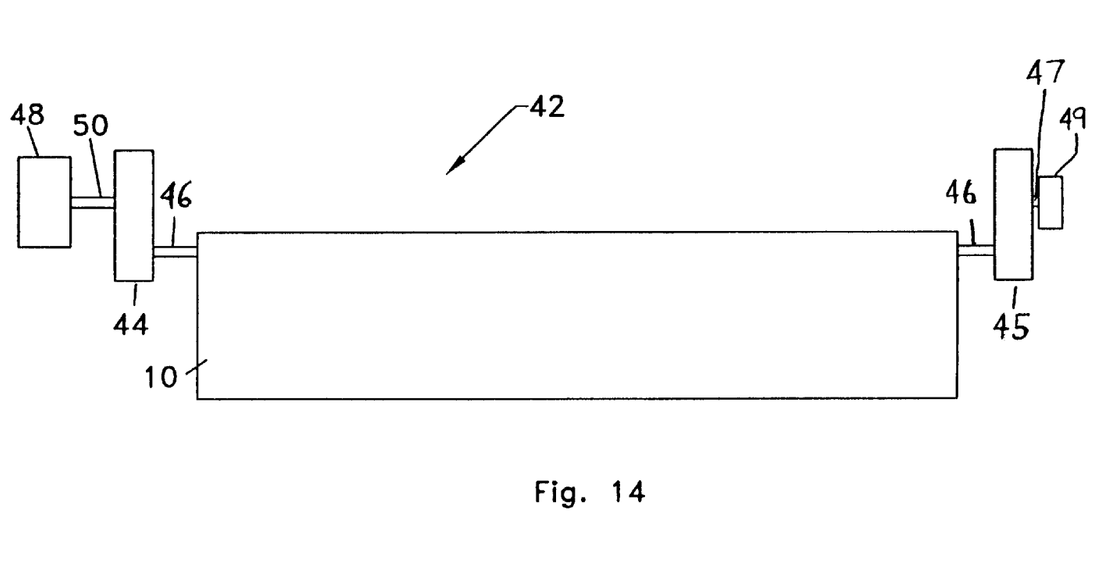
FIG. 14 is a front view of the baffle shown in FIG. 13.

In FIGS. 9 and 10, a second embodiment 30 having a curvilinear track 32 in which the bearing 28 rides replaces the vertical springs 24 of the first embodiment 22. Thus, the baffle 10 in essence becomes a double pendulum having two rotational degrees of freedom. This embodiment 30 was found to provide more heat transfer enhancement than the baffle 10 of the first embodiment 22. In a third embodiment 34 shown in FIGS. 11 and 12, a bent Z-shaped connecting arm 36 replaces the rod 26, bearing 28 and curvilinear track 32. A bottom horizontal rod 38 of the arm 36 is rotatably secured to the baffle 10 where the rod 26 of the first two embodiments 22, 30 was secured. A top horizontal rod 40 of the arm 36 is rotatably secured to a point from where the baffle 10 is to be suspended from in the air flow 14. Therefore, the third embodiment 34 still provides two rotational degrees of freedom, but is a simpler arrangement than the bearing 28 riding in the curvilinear track 32. The third embodiment 34 of the oscillating baffle was tested in a heat transfer tunnel, where it underwent self-sustained oscillations and provided similar heat transfer enhancement as the baffle 10 of the second embodiment 30. Envisioned is a fourth embodiment 42 where the oscillatory baffle motion is produced by a variety of mechanical means. Various combinations of motors, gears and cams could be used to produce the oscillatory baffle motion. FIGS. 13 and 14 represents one version having an eccentrically mounted cams 44, 45 fixed to the baffle 10 by rods 46. Cam 45 includes a freely rotating shaft 47 that is rotatably fixed in a bearing 49. Cam 44 is driven in a periodic rotary fashion by an input shaft 50 attached to an external motor 48. The motor 48 periodically rotates the shaft 50 ninety degrees (90°) to raise the cam 44 and the baffle 10 upward, thereby placing the baffle 10 into the airflow. The shaft 50 then rotates ninety degrees (90°) in the opposite direction to lower the cam 44 and baffle 10 downward to force the airflow downward. The most performance will be obtained with the baffle 10 in a fixed position relative to the cams 44, 45, but the baffle 10 could also be rotatable about the rods 46.

Figure 15:
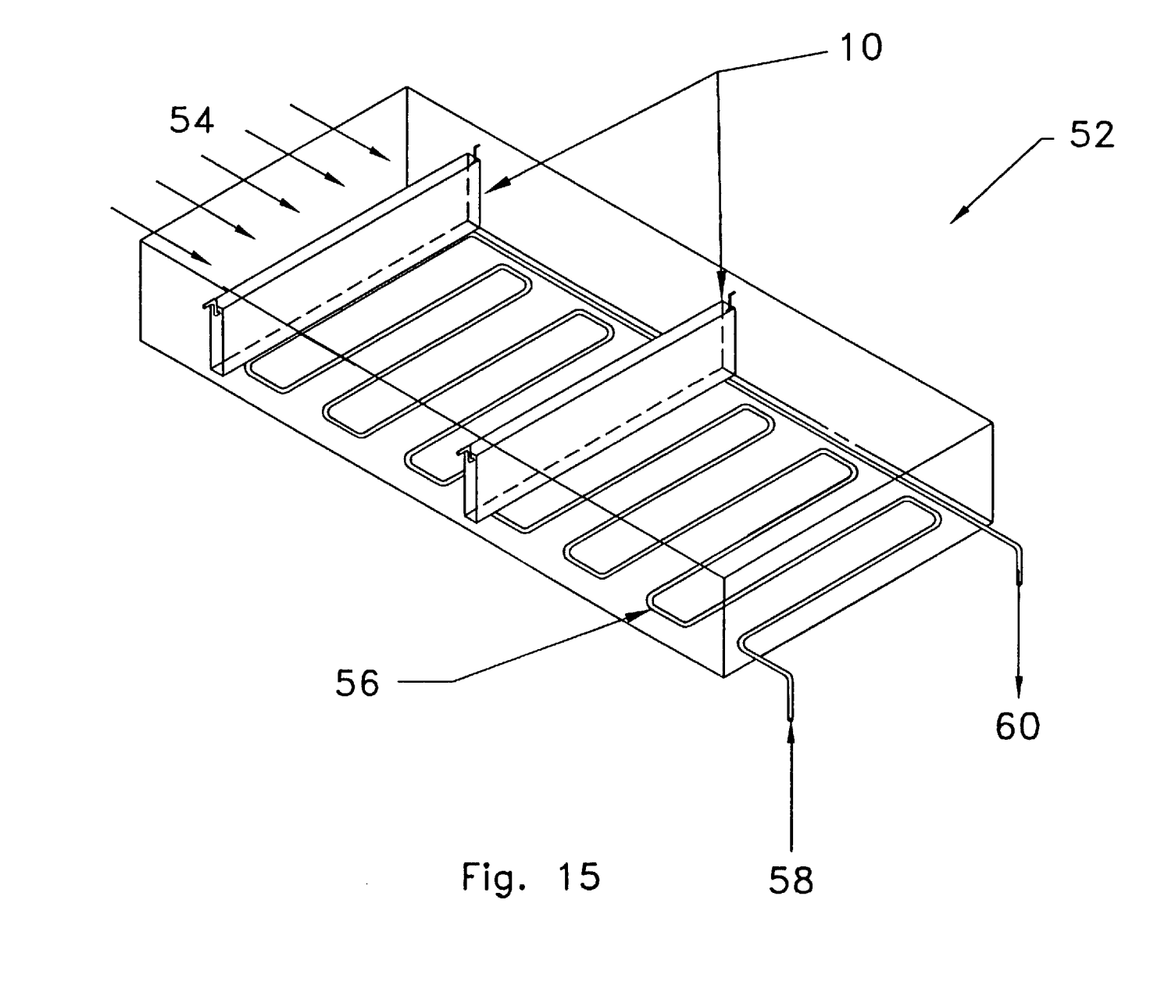
FIG. 15 is a perspective see-through view of a testing apparatus used to test the present invention.
Figure 16:
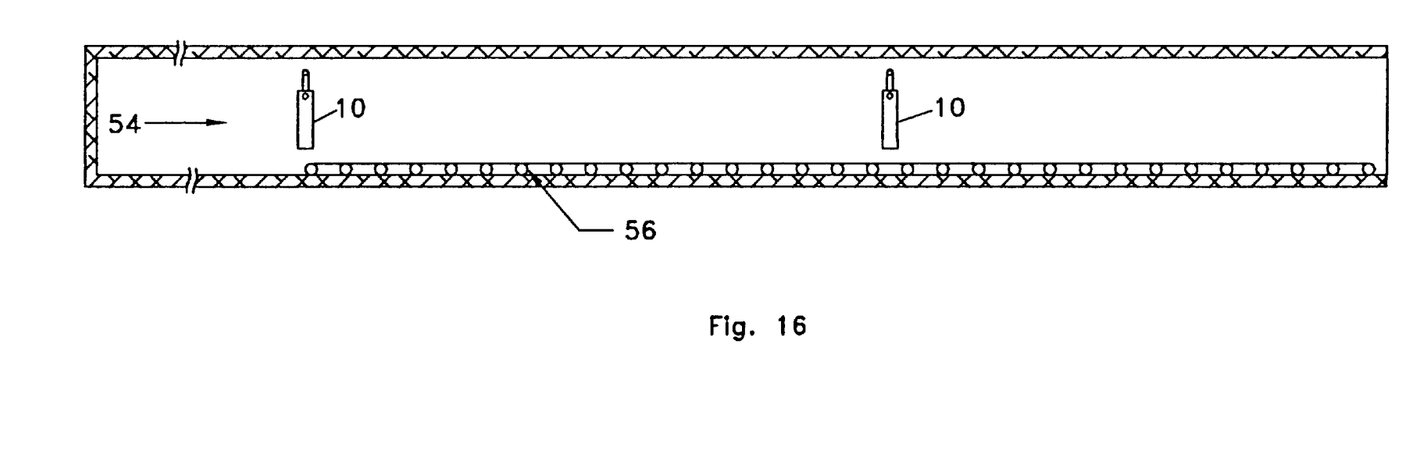
FIG. 16 is a cross-sectional view showing the operation of a baffle according to the present invention in the test apparatus of FIG. 15.
Figure 17:
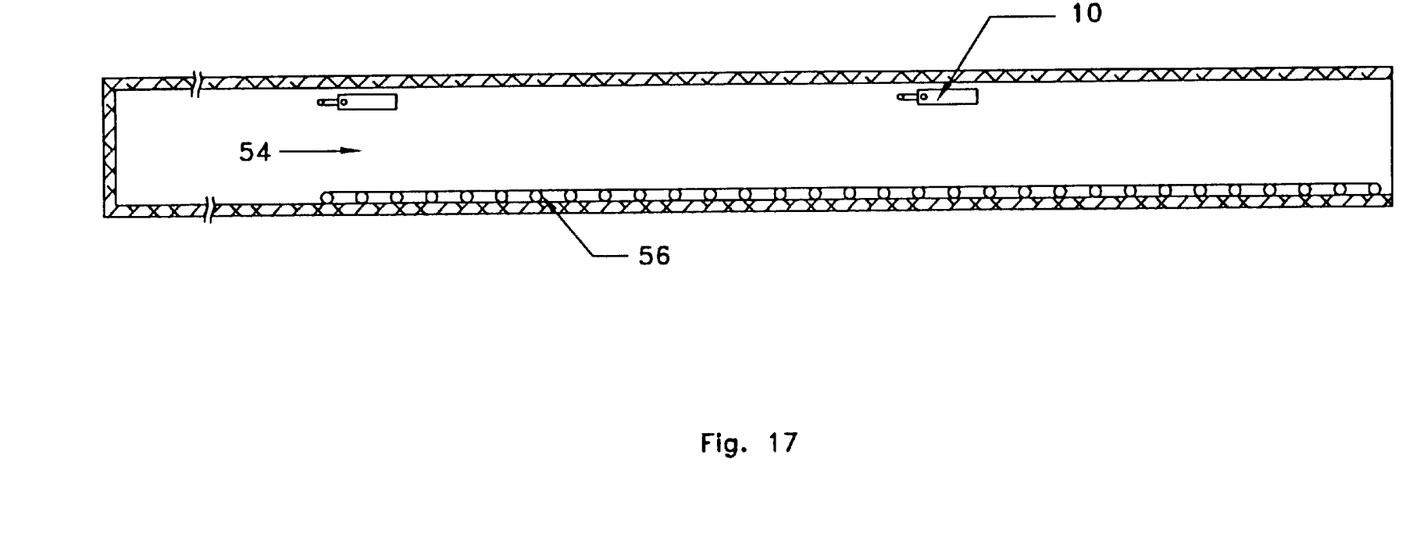
FIG. 17 is a cross-sectional view showing the operation of a baffle according to the present invention in the test apparatus of FIG. 15.

All testing was carried out in a test apparatus 52 shown in FIGS. 15–17. The test apparatus 52 was use to emulate a heat transfer tunnel. Tests were conducted by forcing an air flow 54 through the test apparatus 52 with a two-stage axial flow fan. The test apparatus 52 was approximately thirty (30) inches wide, five (5) inches high and eight (8) feet in length. On the bottom of the last four (4) feet from the fan of the test apparatus, a heat transfer surface 56 was created by fastening together a series of one half (½) inch copper tubing 57 in the shape of U-bends. Water was heated externally and pumped through the copper tubing 57. The temperature of the water was monitored at the inlet 58 and the outlet 60 of the heat transfer surface 56. The change in water temperature through the tubing 57 multiplied by the specific heat and the mass flow rate of water permitted the calculation of the rate of heat transfer. In FIG. 16, the oscillating baffles 10 can be seen in its down position, which is the position of the baffles 10 with no air flow 54 in the test apparatus 52. The up position of the baffles 10 in FIG. 17 is the maximum position to which the baffle 10 oscillates. With the air flow 54 turned on at a specified air velocity, the baffles 10 oscillate between the down and up positions in the range of 3 to 10 Hz. The frequency of baffle oscillation depends primarily on baffle geometry and mass distribution. The frequency of baffle oscillation depends secondarily on the air velocity, where the density of the air or other gas used is a factor.

Figure 18:
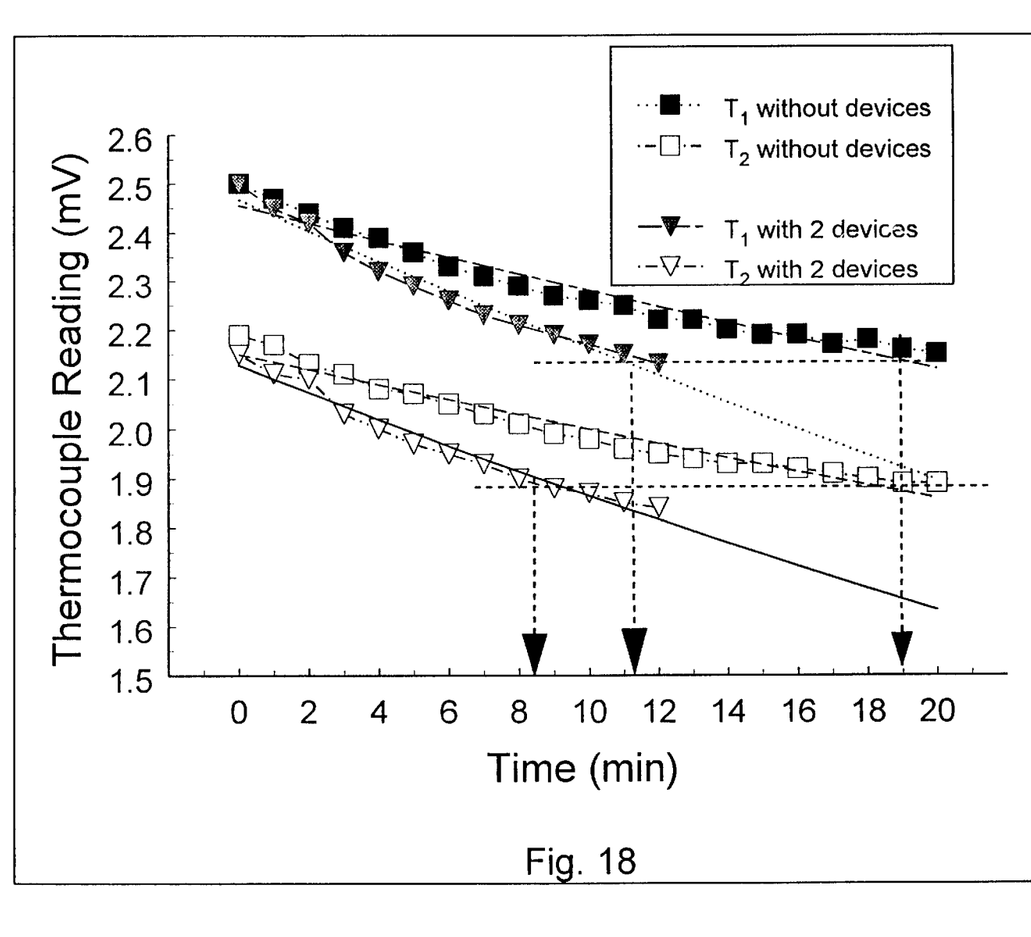
FIG. 18 is a graph of test results using the present invention.

The following discusses actual test data which resulted during use of the test apparatus 52 with and without the baffles 10 according to the present invention. During testing, the water circulating through the copper tubing 57 of the test apparatus 52 was preheated to a specified temperature with no air flow. The fan was then turned on and the air velocity set to a specified value. When the inlet water temperature reached a prescribed starting point, data acquisition was initiated. Thermocouples and other standard measuring devices were used to record the following: temperatures of tem water at the tubing inlet 58 and outlet 60; air temperatures at the test apparatus inlet and outlet; air velocity; and pressure drop across the apparatus. One set of results from testing are shown in FIG. 18 using the following test parameters: preheated water temperature at the tubing inlet of 62° C. and air velocity set at 7.5 m/s. In FIG. 18, the milli-volt readings from the thermocouples are plotted versus time for the above test parameters. Filled square data points denote the inlet temperature and open square data points denote outlet temperature for the test apparatus 52 with no baffles 10 present. Whereas, filled triangles denote inlet temperature and open triangles denote outlet temperature for the test apparatus 52 with two baffles 10 placed twenty-four (24) inches apart above the tubing 57. The time for the inlet and outlet temperatures to drop a specified value of took about 20 minutes without the baffles 10, while with the baffles 10 a similar temperature drop occurred in around 10 minutes.

Figure 19:
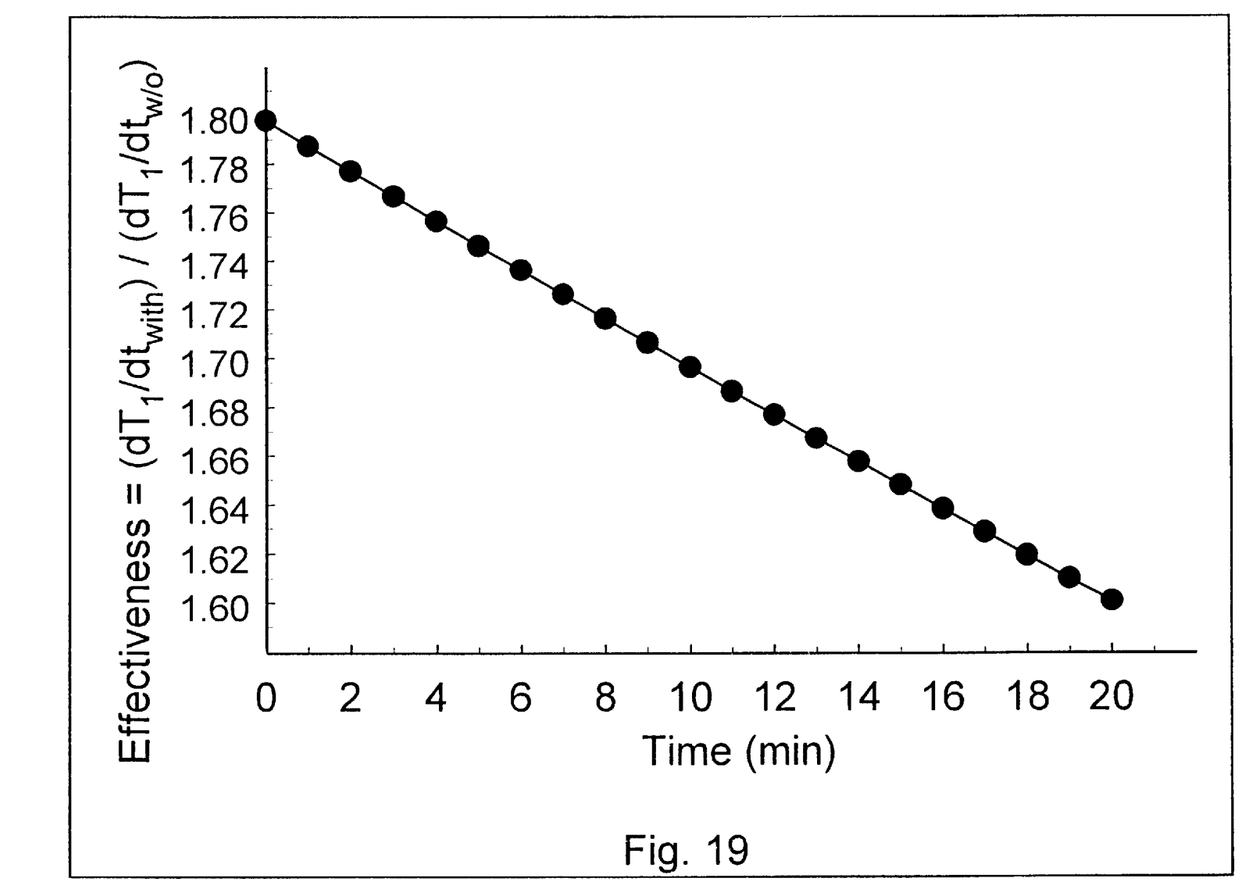
FIG. 19 is a graph of effectiveness of the present invention.

Analytically, the rate of heat transfer can be calculated from the rate of change of temperature with respect to time or by taking the slope of a temperature versus time plot. Doing this for both cases of with and without baffles 10 permits the defining of the term effectiveness (ε) of the oscillating baffles, where (ε) is defined by the following equation:

$$\varepsilon = \frac{(dT/dt)_{with\ baffle}}{(dT/dt)_{without\ baffle}}$$

Where dT is the change in temperature and dt is the change in time. The values of effectiveness (ε) are plotted as a function of time in FIG. 19 for the data shown in FIG. 18. The effectiveness (ε) of the oscillating baffles 10 ranges from 1.8 for warmer conditions to 1.6 for a cooler conditions. Where in the warmer conditions, the product to be cooled and the air flow have a larger temperature difference as compared to the cooler conditions. This implies between sixty (60) and eighty (80) percent more heat transfer occurs with the baffles 10 than without. Most industrial cooling applications would be approximated by continuous operation at or above the warmer conditions shown here. In addition, further improvement in the effectiveness (ε) can be obtained by reducing the spacing between baffles 10 and adding more of them. It was found that the rate of enhancement of the heat transfer per added baffle 10 decreases exponentially with each baffle 10 added, while the pressure drop increases linearly with the number of baffles 10. For the test apparatus 52 used, an optimal baffle spacing of eighteen (18) to twenty-four (24) inches was determined. It is expected that this optimal spacing may change when the length of the heat transfer tunnel is increased to commercially used lengths of several hundred feet. It is also expected that since the thermal boundary layer increases in thickness in the downstream direction of air flow in heat transfer tunnels, that the effectiveness (ε) of the oscillating baffles 10 would be even greater than that measured in the relatively short test apparatus 52.

Figure 20:
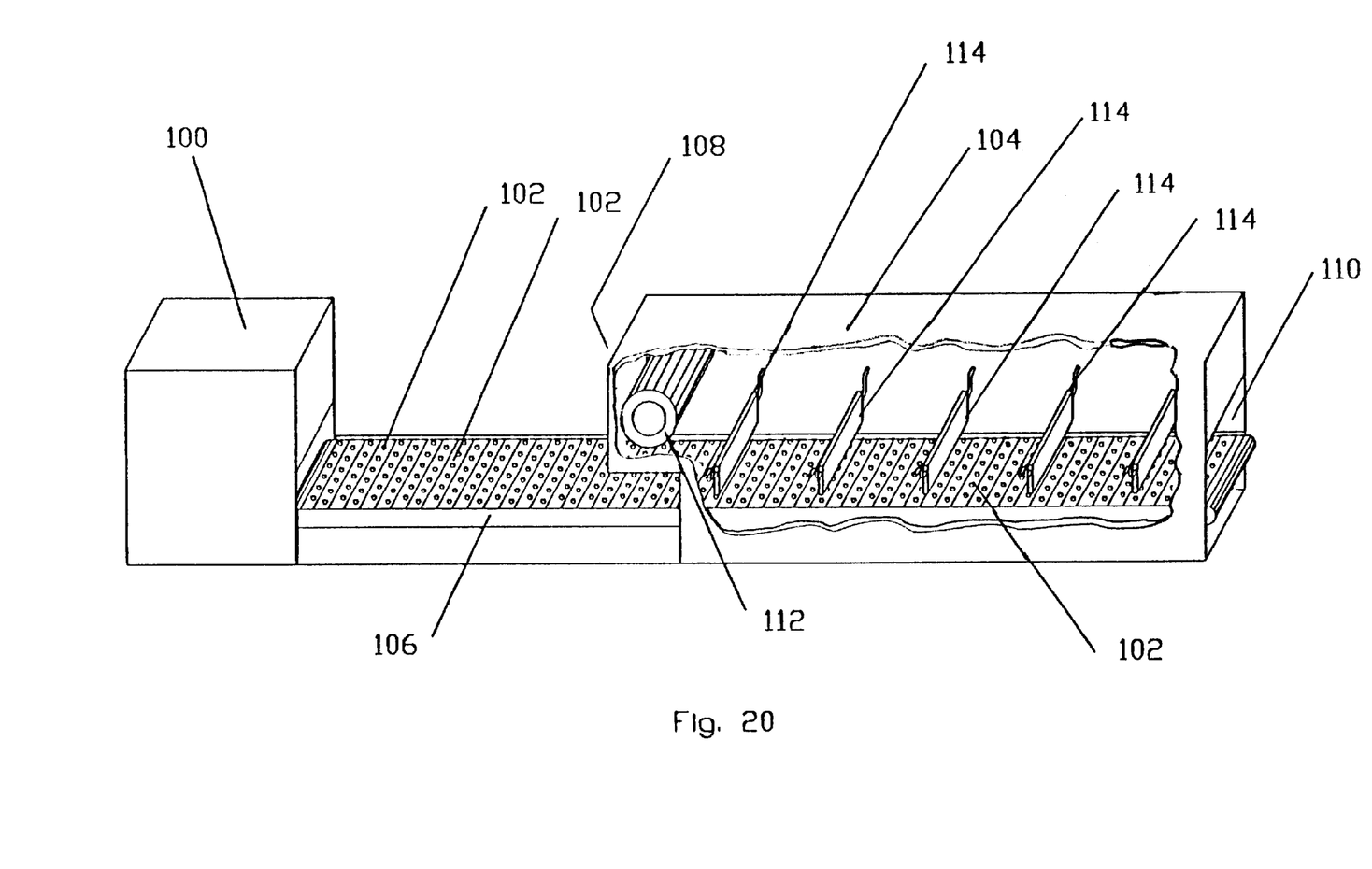
FIG. 20 is a perspective cutaway view of the baking oven utilizing the present invention.

FIG. 20 shows an application of the oscillating baffle 10 which would be useful in the baking industry. Shown is an oven 100 in which products 102 are baked. Once the products 102 are baked, the products 102 are transferred from the oven 100 into a cooling tunnel 104 by a conveyer belt 106. The conveyer belt 106 moves the products 102 through the cooling tunnel 104 to the end of the cooling tunnel 104. At the end of the cooling tunnel 104, the products 102 are cool enough to be packaged. The cooling tunnel 104 has an air inlet 108 where the products 102 enter and an air outlet 110 at the end of the cooling tunnel 104. A fan 112 is used at the air inlet 108 to pull ambient air into the cooling tunnel 104. This ambient air is cooler than the products 102 entering the cooling tunnel 104 and is used to cool the products 102 as they move along the cooling tunnel 104. After the air enters the cooling tunnel 104, it flows along the cooling tunnel 104 and out the air outlet 110. While the air flows along the tunnel 104, the air flow is manipulated by oscillating baffles 114 to cool the products 102. This cooling of the products 102 by the baffles 114 is as discussed in detail above for the oscillating baffle 10. Any one of the embodiments of the oscillating baffle 10 described in the above discussion may be used in the production of baked products. The use of the oscillating baffle 10 as just described would allow the baking industry to increased efficiency and shorten cooling tunnels needed.

While different embodiments of the invention has been described in detail herein, it will be appreciated by those skilled in the art that various modifications and alternatives to the embodiment could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A baking system comprising:
    an oven for producing a baked product; and
    a cooling tunnel for cooling the baked product, said cooling tunnel including a means to move the product inside and along said tunnel;

an air inlet for providing an inlet of a constant air flow inside and along said tunnel; and at least one oscillating baffle, said baffle suspended in said tunnel above the product and along the path of said air flow, whereby the oscillation of said baffle redirects the air flow downward toward the product.

2. The baking system of claim 1, wherein said oscillating baffle further includes a first degree of freedom to rotate and second degree of freedom to rotate; wherein said oscillating baffle includes a baffle having a length between two ends; and wherein said baffle has a height and width which form a cross-section of said baffle.

3. The baking system of claim 2, further including a rod extending from each end of said baffle, two bearings and at least two vertical springs having two ends; wherein each of said rods is rotatably fixed in one of said bearings, thereby providing said first degree of freedom; and wherein each of said bearings is fixed between said two ends of one of said vertical springs, thereby providing said second degree of freedom.

4. The baking system of claim 2, further including a rod extending from each end of said baffle, two bearings having round outer surfaces and two curved surfaces acting as tracks; wherein each of said rods is rotatably fixed in one of said bearings, thereby providing said first degree of freedom; and wherein each of said bearings is placed along one of said curved surfaces, thereby providing said second degree of freedom.

5. The baking system of claim 2, further including two rods, where each of said rods has a main section, a first end and a second end; wherein said first and second ends are at a ninety degree angle to said main section; wherein each of said first ends of said rod is rotatably connected to one of said ends of the baffle, thereby providing said first degree of freedom; and wherein each of said second ends of said rod is rotatably fixed above said baffle, thereby providing said second degree of freedom.

6. The baking system of claim 2, further including two rods extending from said ends of the baffle; a cam connected to each of said rods; a shaft extending from each of said cams; and a motor connected to at least one of said shafts, whereby said motor, rods, cams and shafts simulated said first degree of freedom and second degree of freedom.

7. A method of cooling baked products in a cooling tunnel comprising the steps of:

a. providing a constant input of an air flow into the tunnel along a path which is above the baked products;

b. positioning at least one oscillating baffle in the path of the air flow, where a largest surface area of the baffle intersects the path of the air flow;

c. raising the largest surface area of the baffle upward to a raised position between zero and ninety degrees of angle; and d. redirecting the air flow downward toward the product from the path of the air flow by the baffle moving downward, thereby effecting the cooling of the product by the air flow.

8. The method of claim 7, wherein the baffle of step (b) has a first degree of rotational freedom and second degree of rotational freedom; wherein the raising of the baffle of step (c) is due to the energy of the air flow and the two degrees of rotational freedom of the baffle; and wherein the baffle moves downward in step (d) due to the return of the baffle when the energy of the air flow can no longer maintain the raised position of the baffle.

9. The method of claim 8, further including step (e) repeating steps (c) and (d), due to the constant input of air flow.

10. The method of claim 9, further including step (f) moving the redirected air flow further along the tunnel due to the constant air flow.

11. The method of claim 10, further including step (g) raising a next baffle positioned along the tunnel with the moving redirected air flow of step (f).

12. A baking system comprising:

an oven for producing a baked product; and a cooling tunnel for cooling the baked product; and at least one oscillating baffle means in said tunnel to redirect air flow in said tunnel downward toward the product.

13. The baking system of claim 12, wherein said oscillating baffle further includes a first degree of freedom to rotate and second degree of freedom to rotate; wherein said oscillating baffle includes a baffle having a length between two ends; and wherein said baffle has a height and width which form a cross-section of said baffle.

14. The baking system of claim 13, further including a rod extending from each end of said baffle, two bearings and at least two vertical springs having two ends; wherein each of said rods is rotatably fixed in one of said bearings, thereby providing said first degree of freedom; and wherein each of said bearings is fixed between said two ends of one of said vertical springs, thereby providing said second degree of freedom.

15. The baking system of claim 13, further including a rod extending from each end of said baffle, two bearings having round outer surfaces and two curved surfaces acting as tracks; wherein each of said rods is rotatably fixed in one of said bearings, thereby providing said first degree of freedom; and wherein each of said bearings is placed along one of said curved surfaces, thereby providing said second degree of freedom.

16. The baking system of claim 13, further including two rods, where each of said rods has a main section, a first end and a second end; wherein said first and second ends are at a ninety degree angle to said main section; wherein each of said first ends of said rod is rotatably connected to one of said ends of the baffle, thereby providing said first degree of freedom; and wherein each of said second ends of said rod is rotatably fixed above said baffle, thereby providing said second degree of freedom.

17. The baking system of claim 13, further including two rods extending from said ends of the baffle; a cam connected to each of said rods; a shaft extending from each of said cams; and a motor connected to at least one of said shafts, whereby said motor, rods, cams and shafts simulated said first degree of freedom and second degree of freedom.

18. The baking system of claim 1, further including an air flow movement means to generate said constant air flow through said cooling tunnel.

19. The baking system of claim 18, wherein said oscillating baffle further includes a first degree of freedom to rotate and second degree of freedom to rotate; wherein said oscillating baffle includes a baffle having a length between two ends; and wherein said baffle has a height and width which form a cross-section of said baffle.

20. The baking system of claim 1, wherein said means to move the product is a conveyor belt.

* * * * *